United States Patent [19]

Kitamura et al.

[11] Patent Number: 5,307,218
[45] Date of Patent: Apr. 26, 1994

[54] MAGNETIC DISK APPARATUS USING BOTH SERVO-SURFACE SERVO AND DATA-SURFACE SERVO

[75] Inventors: Shunji Kitamura, Saitama; Tomihisa Ogawa, Tokyo, both of Japan

[73] Assignee: Kabushiki Kaisha Toshiba, Kanagawa, Japan

[21] Appl. No.: 107,034

[22] Filed: Aug. 17, 1993

Related U.S. Application Data

[63] Continuation of Ser. No. 549,182, Jul. 5, 1990, abandoned, which is a continuation-in-part of Ser. No. 174,352, Mar. 28, 1988, abandoned.

[30] Foreign Application Priority Data

Mar. 31, 1987 [JP] Japan .................................. 62-77866

[51] Int. Cl.⁵ .......................................... G11B 5/596
[52] U.S. Cl. .....:........................... 360/77.08; 360/77.05; 360/75
[58] Field of Search ............... 360/46, 75, 77.02–77.11, 360/78.04–78.14

[56] References Cited

U.S. PATENT DOCUMENTS

| | | | |
|---|---|---|---|
| Re. 32,075 | 1/1986 | Harrison et al. | 360/77 |
| 3,534,344 | 10/1970 | Santanna | 360/77.05 |
| 3,846,829 | 11/1974 | Lin | 360/46 |
| 4,072,990 | 2/1978 | Case et al. | 360/77.05 |
| 4,136,365 | 1/1979 | Chick et al. | 360/77.11 |
| 4,414,589 | 11/1983 | Oliver et al. | 360/77.08 |
| 4,531,167 | 7/1985 | Berger | 360/77.08 |
| 4,969,056 | 11/1990 | Negishi et al. | 360/66 |
| 5,012,363 | 4/1991 | Mine et al. | 360/77.08 |

FOREIGN PATENT DOCUMENTS

| | | | |
|---|---|---|---|
| 0042931 | 1/1982 | European Pat. Off. | . |
| 0094314 | 11/1983 | European Pat. Off. | 360/77.05 |
| 0189503 | 8/1986 | European Pat. Off. | . |
| 63-244382 | 10/1988 | Japan | 360/77.05 |

OTHER PUBLICATIONS

IBM Disk Storage Technology, "Servo Design for an Eight Inch Disk File", Commander et al., Feb. 1980, pp. 89–97.

*Primary Examiner*—Jerry Smith
*Assistant Examiner*—Steven R. Garland
*Attorney, Agent, or Firm*—Finnegan, Henderson, Farabow, Garrett & Dunner

[57] ABSTRACT

A magnetic disk apparatus using a servo-surface servo and a data-surface servo is disclosed which comprises a servo disk which is disposed on a rotating axis and which has a servo surface on which first servo information is written and a data disk which is disposed on the rotating axis and which has a data surface. A servo head is provided for reading the first servo information from the servo disk and a read/write head is provided which works in association with the servo head for reading and writing information from and to the data surface. Structure is provided to generate a second servo information to be written on the data surface, to command a write timing of the second servo information, to control the write operation, and to control the positioning of the read/write head position. Thus, according to servo information being read from the servo head, servo information to be written to the data surface is generated and written to the data surface.

8 Claims, 5 Drawing Sheets

MAGNETIC DISK APPARATUS USING BOTH SERVO-SURFACE SERVO AND DATA-SURFACE SERVO

This application is a continuation of application Ser. No. 07/549,182, filed Jul. 5, 1990, now abandoned, which is a continuation-in-part of application Ser. No. 07/174,352, filed Mar. 28, 1988, now abandoned.

The present invention relates to a magnetic disk device employing both a servo-surface servo system and a data-surface servo one.

For achieving large capacity on a magnetic disk device, the technique is known of raising a track density on one surface of a magnetic disk.

In order to raise track density, it is necessary to achieve high accuracy in positioning a read/write head. For this purpose, it is effective to do tracking control by a closed loop servo system.

The normal magnetic disk apparatus includes a plurality of stacked magnetic disks which are concentrically rotated. In this construction, a servo-surface servo system is often used wherein tracking is controlled by reproducing the positioning information (servo pattern) and pre-recording it on an exclusive servo surface specified among recording surfaces.

This system, however, has a tendency to bring about mechanical position slippage on the data surface separated from the servo surface, caused by a temperature change, for example, so that it is impossible to raise the track density of the device significantly.

In order to overcome this shortcoming and increase track density even more, there has been developed a data-surface servo system wherein positioning information is recorded on a data surface without specifying an exclusive servo surface. This system, however, has a shortcoming that a magnetic head cannot be moved at high speed and the access time is made longer because it records position information more discretely than the servo-surface servo system.

Under these circumstances, recently, a new system has been developed wherein a data-surface servo and a servo-surface servo are combined with each other for compensating respective shortcomings.

This system (hereinafter, referred as to a combination servo system) can achieve large capacity and high performance in a magnetic disk apparatus, since the positioning accuracy is high and the access time is short. This system, however, has the shortcoming that the system includes positioning information on the data surface and the servo surface which is pre-written during the assembling steps of this apparatus. Thus the data format on the data surface is considerably restricted.

OBJECT AND SUMMARY OF THE INVENTION

The present invention is made in consideration of the shortcomings described above, and an object of the invention is to enlarge an area to be data-formatted o the data surface in the magnetic disk apparatus for positioning in combination with a servo system.

The present invention is a magnetic disk apparatus using both a servo-surface servo and a data-surface servo, the apparatus comprising a servo disk which is disposed on a rotating axis and which has a servo surface on which first servo information is written, a data disk which is disposed on the rotating axis and which has a data surface, a servo head for reading the first servo information from the servo disk, a read/write head which works in association with the servo head for reading and writing information from and to the data surface, a second servo information generation means for generating second servo information to be written on the data surface, a means for commanding a write timing of the second servo information and for controlling the write operation, and a positioning control means for controlling the positioning of the read/write head position.

Since the apparatus according to the present invention can write servo data on the data surface, the servo data can be written according to the user's circumstances rather than being fixed when shipped from the factory.

DETAILED DESCRIPTION OF THE PREFERRED EMBODIMENT

Now, by referring to the attached drawings, an embodiment according to the present invention will be described in detail.

Figure 1:
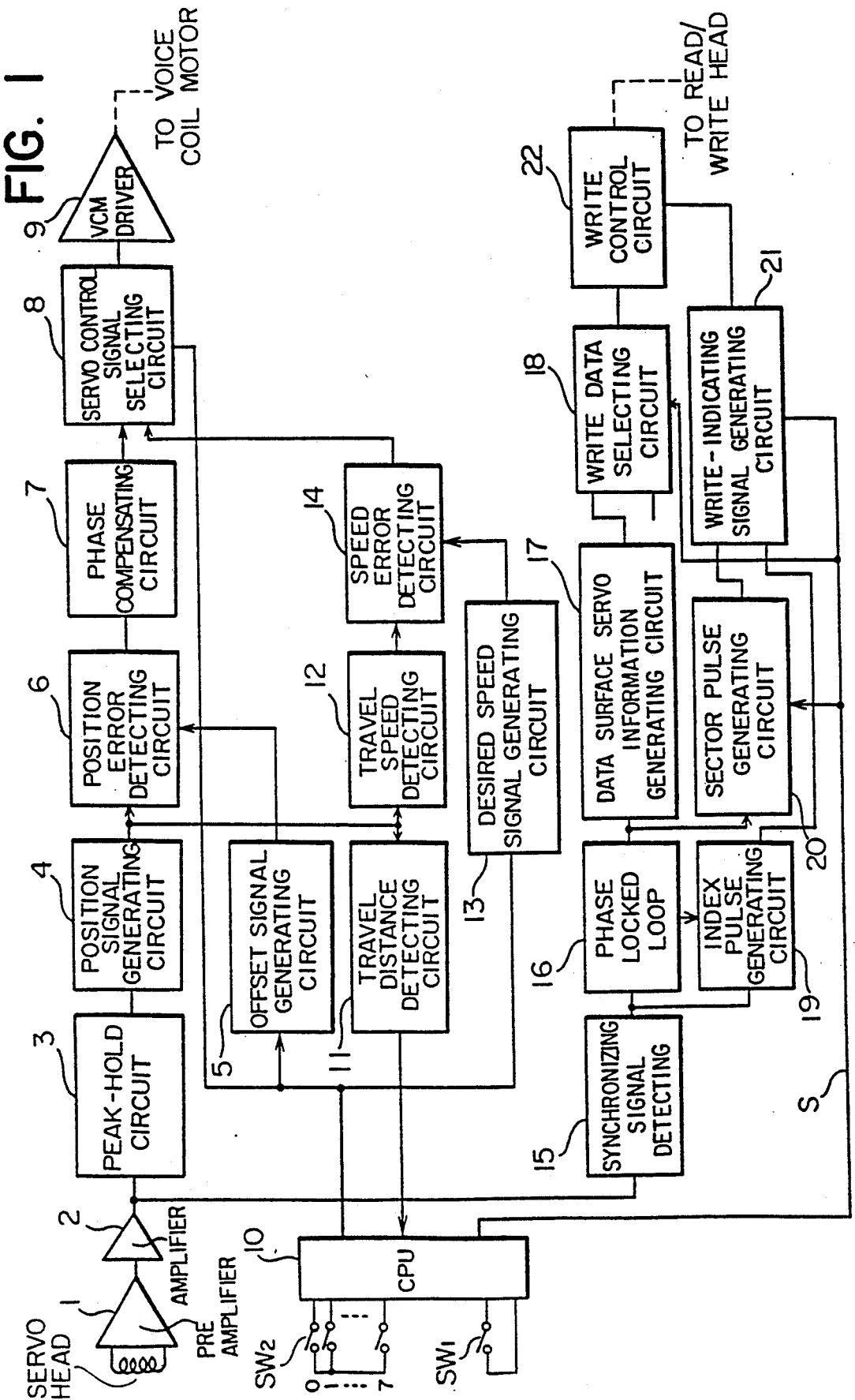
FIG. 1 is a block diagram showing the structure of a magnetic disk apparatus according to an embodiment of the present invention.

FIG. 1 is a schematic showing the structure of an embodiment according to the present invention.

The magnetic disk apparatus uses both a servo-surface servo method and a data-surface servo method. In other words, a servo disk on which servo information is written and a data disk on which conventional data is written are rotatably disposed on a common axis. The servo information on the servo disk is read by a servo head. The data on the data disk is read and written by a read/write head. The servo head works in association with the read/write head.

In this figure, numeral 1 denotes a preamplifier for amplifying a signal read out from a servo surface by a servo head, 2 denotes an amplifier for amplifying a signal output by the preamplifier 1, 3 denotes a peak-hold circuit for holding a peak level of a signal output by the amplifier 2, and 4 denotes a position signal generating circuit for generating a signal corresponding to a servo head position on the basis of the peak level-generating timing.

Numeral 5 denotes an offset signal generating circuit for generating an offset signal required for intentionally slipping the servo head position by ½ track.

Numeral 6 denotes a position error detecting circuit for detecting a position error of the servo head according to an output signal from the position signal generating circuit 4 an that from the offset signal generating circuit 5.

Numeral 7 denotes a phase compensating circuit for compensating a phase error of an output signal of the position error detecting circuit 6.

Numeral 8 denotes a servo control signal selecting circuit for changing the position control signal and for outputting a required signal into a voice coil motor (hereinafter, referred as to VCM) driver, and 9 denotes the VCM driver for supplying an operating current to a VCM for moving both the servo head and a read/write head.

Numeral 10 denotes a CPU for controlling the offset signal generating circuit 5 and the servo control signal selecting circuit 8, SW1 is a switch for designating a mode in which servo information is written to the data surface, SW2 is a switch for designating the number of sectors per track, 11 denotes a travel distance detecting circuit for detecting travel distance of the servo head on the basis of the signal output by the position signal generating circuit 4, and 12 denotes a travel speed detecting circuit for detecting seek speed of the servo head on the basis of the position signal generating circuit 4. CPU 10 indicates to the sector pulse generating circuit the number of the sectors generated in one rotation by selecting the number of generated sectors by eight bits of switch SW$_2$ (0-7) shown in FIG. 1.

Numeral 13 denotes a desired speed signal generating circuit for outputting signal indicating a desired travel speed which causes the servo head to be displaced for the shortest period, and 14 denotes a speed error detecting circuit for outputting a signal indicating a speed error of the servo head detected as a result of comparing the travel speed detecting circuit 12 with the desired speed signal generating circuit 13.

Moreover, numeral 15 denotes a synchronizing signal detecting circuit for detecting a synchronizing signal from the servosurface read out signal output by the amplifier 2, 16 denotes a phase locked loop (PLL) circuit for synchronizing and oscillating a required frequency from the read out signal in accordance with the rotation of the servo surface, 17 denotes a data surface servo information generating circuit for generating servo information recorded on the data surface by separating desirably the output of PLL, and 18 denotes a write data selecting circuit for selecting either one of servo information and normal data for writing on the data surface.

Numeral 19 denotes an index pulse generating circuit for generating an index pulse for data-surface servo information from the servo-surface read out information, 20 denotes a sector pulse generating circuit for generating a sector pulse for data-surface servo information, 21 denotes a write indicating signal generating circuit for generating a signal for defining the starting timing of writing servo information on the data surface in association with the index pulse and the sector pulse, and 22 denotes a write control circuit for controlling the writing of data-surface servo information in accordance with the signal sent from the write-indicating signal generating circuit 21. The write control circuit 22 also controls the writing of normal data when write indicating is indicated.

Now, the operation for generating servo information to be written on the data surface of the data disk according to the servo information being read from the servo disk and for writing the servo information onto the data surface will be described.

Figure 2:
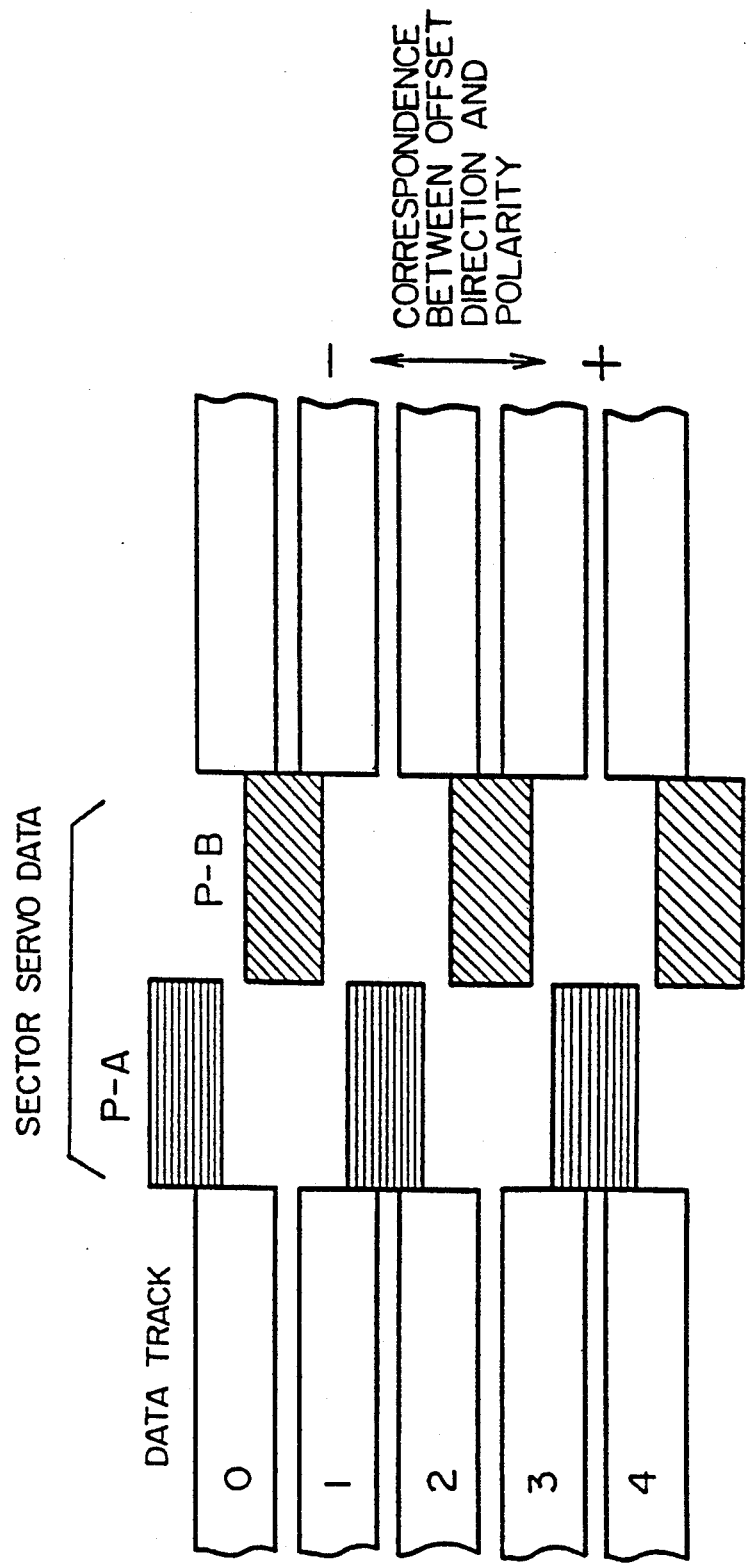
FIG. 2 shows servo information written on a servo surface of a data disk.
Figure 3:
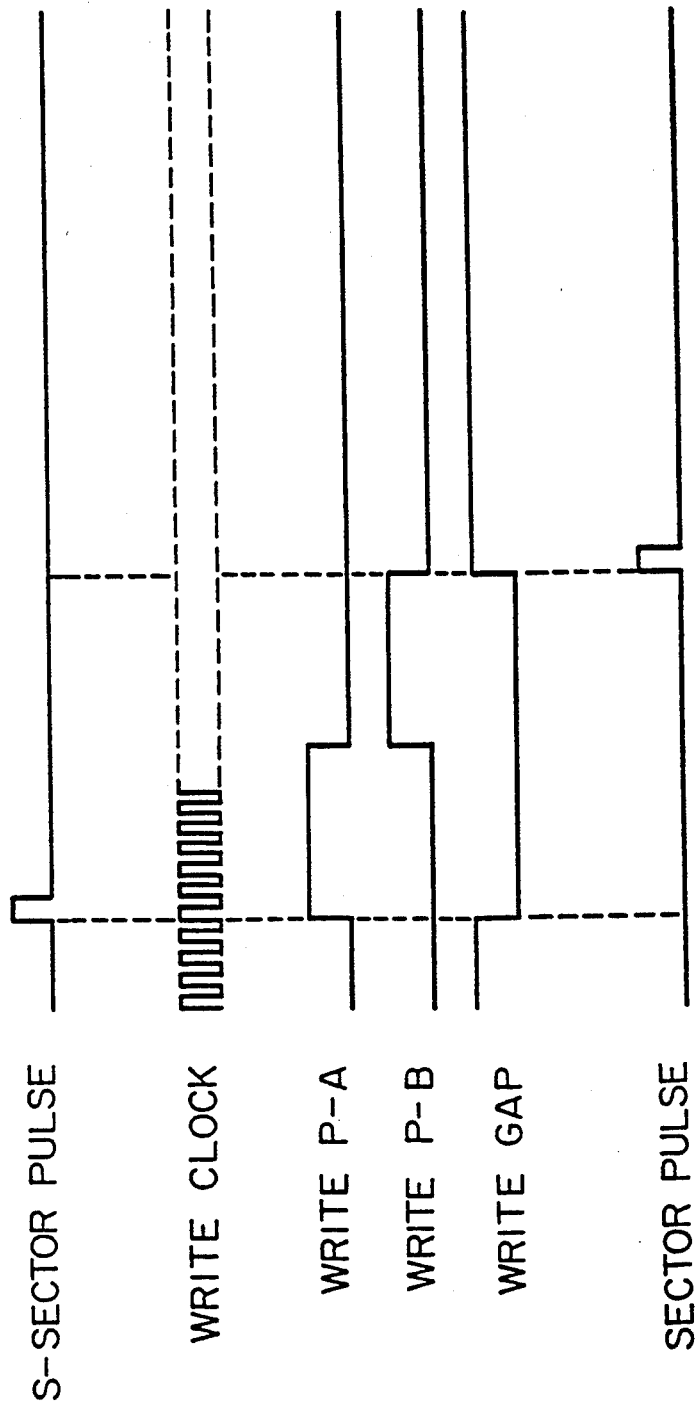
FIG. 3 is a timing diagram showing various signals used when servo information is written on the data disk.

FIG. 2 shows servo information written on the data surface and FIG. 3 shows waveforms of various signals used when servo information is written on the data surface. When a switch SW1 is turned on and an initialize mode is designated, the entire data disk is erased. This is due to the fact that if new servo information is written on a data surface already having old servo information, it will cause cross talk with the new servo information.

The entire data surface is erased in the following manner. The CPU 10 sets the output of the offset signal generating circuit 5 to "0" so that the read/write head is not offset. In this state, the read/write head erases tracks on the data surface from track 0 to track N one by one whenever the disk is rotated.

Then, the CPU 10 controls the output from the offset signal generating circuit 5 and provides an offset of $+\frac{1}{2}$ track to the read/write head. In this state, the read/write head erases the tracks from track N to track 0 one by one whenever the disk is rotated.

The reason why the offset of $+\frac{1}{2}$ track is provided to the read/write head is that when servo information is written onto the data surface, actually the servo information deviates from the conventional data by $\frac{1}{2}$ track as shown in FIG. 2.

Then, at track 0, an offset of $-\frac{1}{2}$ track is provided to the read/write head to erase the track. The reason why the offset of $-\frac{1}{2}$ track is provided to the read/write head is that at the outermost track 0, servo information is written on the minus (−) side thereof.

In the method described above, the entire data surface is erased and then servo information is written on the data surface.

The servo information is written on the data surface in the following manner. First, with no offset provided to the read/write head, pattern "0[ is written from track 0 to track N by the read/write head. Then, an offset of $\frac{1}{2}$ track is provided to the read/write head by the offset signal generating circuit 5 while the read/write head is positioned at track N. According to the timing of write signal P-B (shown in FIG. 3), the servo information P-B is written by the entire read/write head and then the offset is removed therefrom.

After that, the read/write head is moved to track (N−1) and an offset of $-\frac{1}{2}$ track is provided to the read/write head. According to the timing of the write signal P-A (as shown in FIG. 3), the servo information P-A is written by the entire read/write head and then the offset is removed therefrom.

The above operations are repeated until the servo information is written from track N to track 0.

Now, the generation of the write signals P-A and P-B will be described. According to the servo information which has been read by the servo head 1, the sector pulse generating circuit 20 generates S - sector pulse. The write-indicating signal generating circuit 21 generates write signal P-A and write signal P-B according to the output from the index pulse generating circuit 19 and the sector pulse generating circuit 20. The write signal P-A denotes a timing where the servo information P-A shown in FIG. 2 is written. The write signal P-B denotes a timing where the servo information P-B shown in FIG. 2 is written. The S-sector pulse is used only when servo information is written on the data surface. On the other hand, a sector pulse is used to control the tracking of the data format. When either the write signal P-A or the write signal P-B go high, the write gap signal goes low.

Now, the generation of servo information to be written will be described.

The servo information to be written on the data surface is burst data. The servo information which is read from the servo disk by the servo head 1 contains synchronizing signal with a particular period. The synchronizing signal detecting circuit 15 detects the synchronous signal.

The PLL circuit 16 oscillates at a particular frequency according to the synchronous signal. The data surface servo information generating circuit 17 generates a servo signal which is a burst signal according to the output from the PLL circuit 16.

Now, the operation for writing servo information to the data disk will be described in further detail. According to a command from the CPU 10, the write data selecting circuit 18 selects servo information which is output from the data surface servo information generating circuit 17 and sends it to the write control circuit 22. Since the write-indicating signal generating circuit 21 has sent the write signals P-A and P-B to the write control circuit 22, the write control circuit 22 sends the servo information to the read/write head according to the timings of the write signals P-A and P-B so as to write the servo information to the data surface.

The servo data is written only when the initialize mode is selected by the mode selection switch SW1. In other words, the servo information is written when the power supply is turned on, the initial seek is completed, and then the servo head is positioned at track 0 (cylinder 0). When the initialize mode is not selected by the switch SW1, after the initial seek is completed, the drive ready state just takes place.

Now, the operation for causing the read/write head (servo head) to be positioned on any track will be described in detail.

Figure 4:
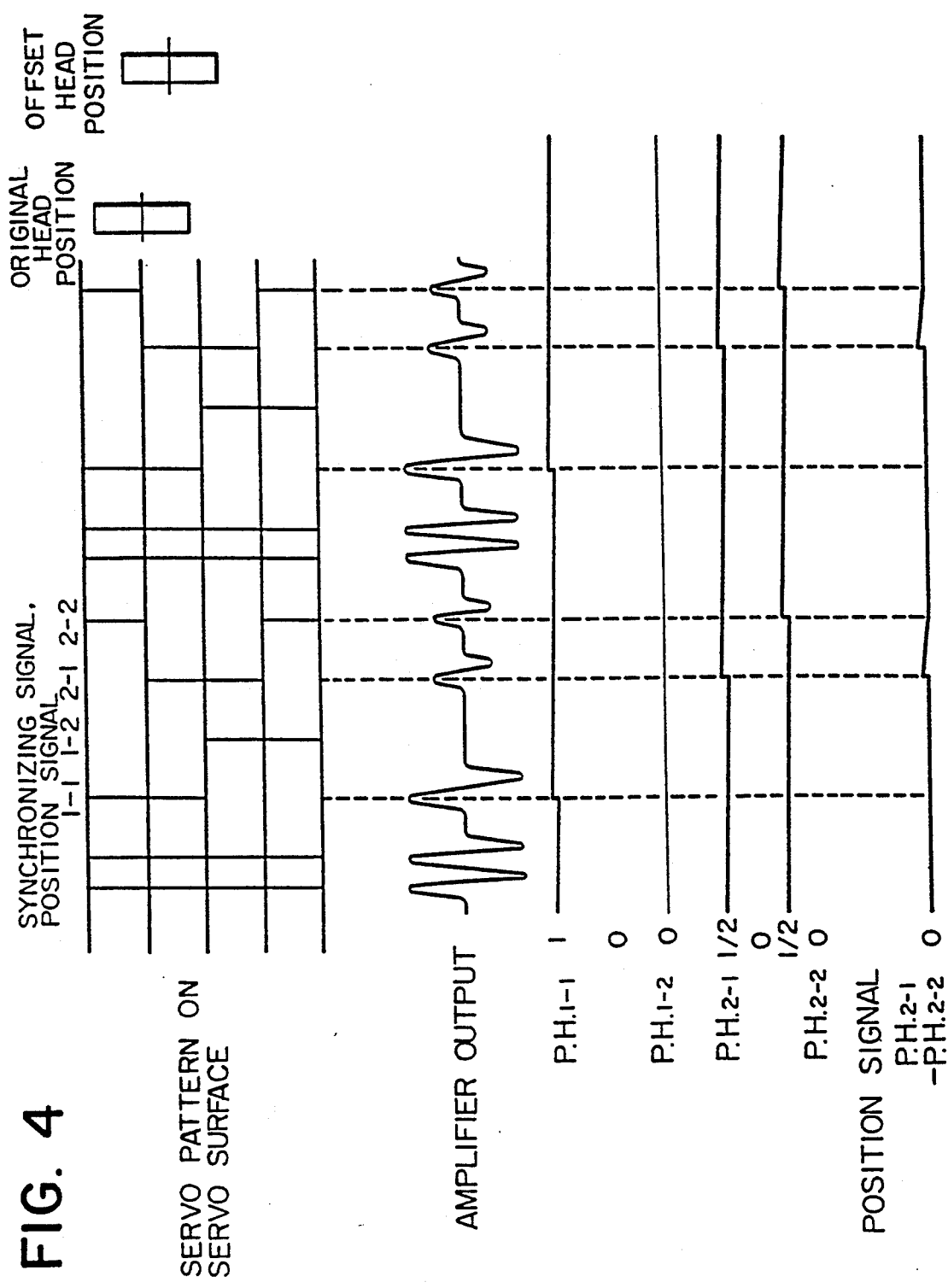
FIG. 4 is a timing diagram showing servo information written on the servo surface of the servo disk and that showing output signals from the servo head and the peak hold circuit.

FIG. 4 shows a servo pattern on a servo surface with corresponding AMPLIFIER OUTPUT signals and signals of the peak-hold circuit 3. The AMPLIFIER OUTPUT in FIG. 4 is an output signal of the amplifier 2 where the servo head is placed in the original position.

In the figure, 1-1, 1-2, 2-1, and 2-2 denote peak hold timings. At the 1-1, 1-2, 2-1, and 2-2 timings, the output signal of the amplifier 2 is peak-held periodically. The signal being peak-held is represented by PH.

The position signal generating circuit 4 computes the position signal by subtracting (PH 2-2) from (PH 2-1). A current is flowed from the VCM driver 9 so that the position signal becomes 0. Occasionally, the position of the read/write head (servo head) may be adjusted so that (PH 1-1)−(PH 1-2)=0.

Now, the operation for providing an offset of ½ track to the read/write head will be described. According to a command from the CPU 10, the offset signal generating circuit 5 generates an amount of offset equivalent to −½ track and sends it to the position error detecting circuit 6. The position error detecting circuit 6 adds the amount of offset which is output from the offset signal generating circuit 5 to the position signal which is output from the position signal generating circuit 4. The VCM driver 9 flows a current to VCM so that the amount of offset becomes 0. Conversely, when the offset signal generating circuit 5 generates an amount of offset equivalent to +½ track according to a command from the CPU 10, the read/write head is offset for −½ track.

The conventional data is written to the data surface of the data disk in the following manner. According to a command from the CPU 10, the write data selecting circuit 18 selects data to be written. The data is sent to the read/write head through the write control circuit 22 and then written by the read/write head.

Figure 5:
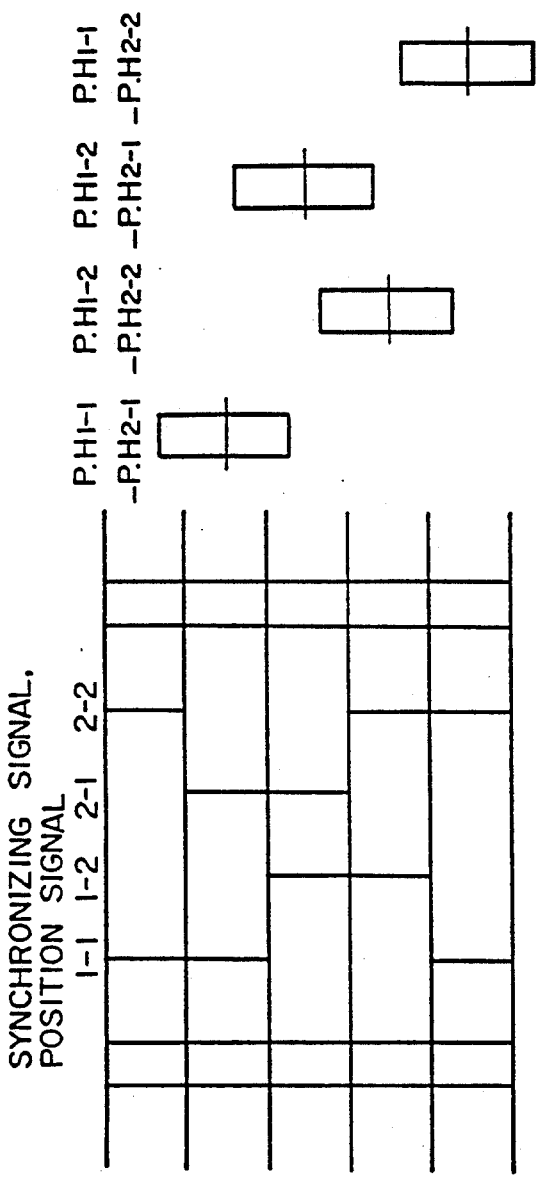
FIG. 5 is a diagram showing servo information and the position of the servo head in another embodiment of the present invention.
Figure 6:
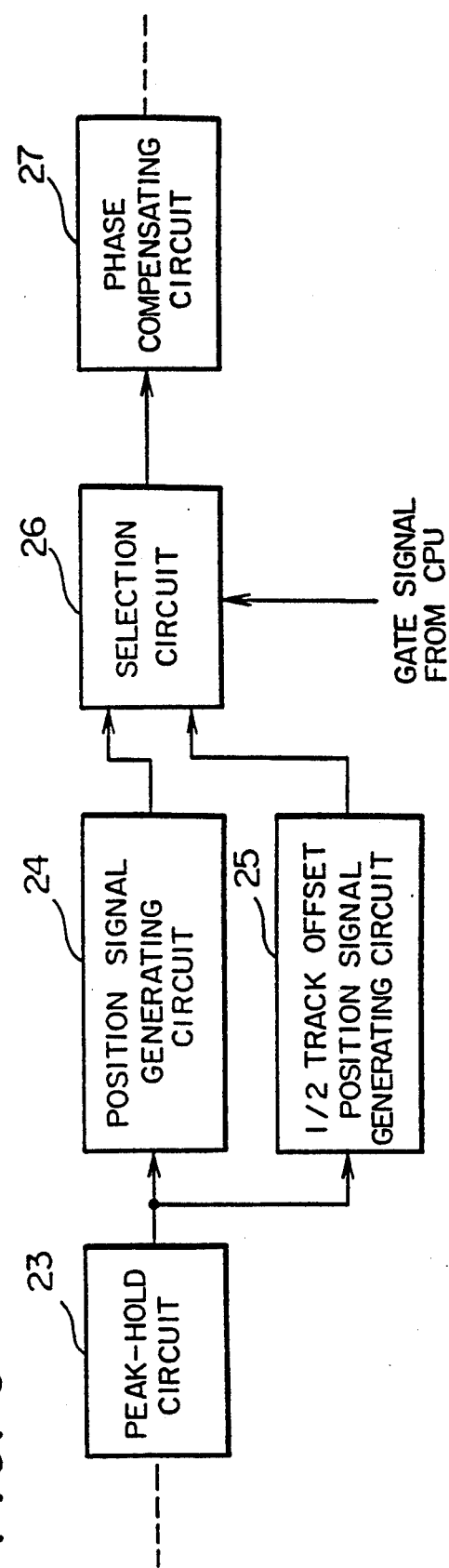
FIG. 6 is a block diagram showing the structure of principal section of the magnetic disk apparatus of the embodiment shown in FIG. 5.

FIGS. 5 and 6 relate to a magnetic disk apparatus according to another embodiment of the present invention. In this embodiment, another structure is provided to offset the read/write head for ½ track.

FIG. 5 shows servo information which is written on the servo disk and the head position. FIG. 6 shows another structure where the read/write head is offset for ½ track.

As shown in FIG. 6, in this magnetic disk apparatus, the peak-hold circuit 3, the position signal generating circuit 4, the offset signal generating circuit 5, the position error detecting circuit 6 and the phase compensating circuit 7 shown in FIG. 1, a peak-hold circuit 23 are not provided. Instead, a position signal generating circuit 24, a ½ track offset position signal generating circuit 25, a selection circuit 26, and a phase compensating circuit 27 are provided.

In such a magnetic disk apparatus, the read/write head is offset for ½ track in the following manner. Typically, as described above, the head is positioned so that {(PH 1-1)−(PH 1-2)} or {(PH 2-1)−(PH 2-2)} becomes 0. In FIG. 6, the ½ track offset position signal generating circuit 25 computes (PH 1-1)−(PH 2-1) and the VCM driver 9 flows a current to VCM so that the computed value becomes 0. Thus, the head is offset.

As shown in FIG. 5, when {(PH 1-1)−(PH 2-1)} becomes 0, the head is placed in the most left position of FIG. 5. When each of {(PH 1-2)−(PH 2-2)}, {(PH 1-2)−(PH 2-1)}, and {(PH 1-1)−(PH 2-2)} is set to 0, the head is accordingly placed in the position shown in the figure.

Moreover, in the present invention various modifications may be made. Although in the first embodiment servo information of a burst signal was generated by the PLL circuit 16, it is possible to generate the servo information by means of an oscillator instead of the PLL circuit. Although in the first embodiment described above the write operation of the servo information on the data surface was designated by the operation of the switch SW1, it is possible to designate it by means of a command from a magnetic disk controller.

In the embodiments described above, a sector servo type magnetic disk apparatus was considered. However, it is possible to consider an index servo type magnetic disk apparatus as well.

What is claimed is:

1. A magnetic disk apparatus comprising:
    a servo disk which is disposed on a rotating axis and which has a servo surface on which first servo information is recorded;
    a data disk which is disposed on said rotating axis and which has a data surface, said data surface having a track;
    means for reading said first servo information from said servo surface of said servo disk;
    means for inputting a desired number of sectors which divided said track;
    second servo information generation means for generating second servo information from said first servo information, said second servo information being written on said data surface; and
    means for writing said second servo information on said data surface according to said input number of sectors.

2. A magnetic disk apparatus as set forth in claim 1 wherein said second servo information generation means comprises a phase locked loop circuit for generating a burst signal according to said first servo information which is read from said means for reading said first servo information.

3. A magnetic disk apparatus as set forth in claim 1, further comprising
erasing means for erasing previous data recorded on said data surface of said data disk before
said second servo information is written on said data surface.

4. A magnetic disk apparatus as set forth in claim 3, wherein said second servo information generation means comprises a phase locked loop circuit for generating a burst signal according to said first servo information which is read with said first servo information reading means.

5. A method of writing servo information on a data surface of a data disk which is disposed on a rotating axis on which a servo disk is disposed, said servo disk having a servo surface, said data surface having a track, first servo information being recorded on said servo surface, said method comprising the steps of:

inputting a desired number of sectors which divide said track;
generating a second servo information from said first servo information; and
writing said second servo information on said data surface according to said input number of sectors.

6. A method as set forth in claim 5, wherein said second servo information generating step further comprises the step of generating a burst signal according to said first servo information which is read with said first information reading means.

7. A method as set forth in claim 5, further comprising the step of
erasing previous data recorded on said data surface of said data disk before said second servo information is written on said data surface.

8. A method as set forth in claim 7, wherein said second servo information generating step further comprises the step of generating a burst signal according to said first servo information which is read with a first servo information reading means.

* * * * *